US011242953B2

(12) United States Patent
Gubler et al.

(10) Patent No.: US 11,242,953 B2
(45) Date of Patent: *Feb. 8, 2022

(54) CALIBRATION FOR IMAGE STABILIZATION MECHANISM (71) Applicant: GoPro, Inc., San Mateo, CA (US)

(72) Inventors: Thomas Gubler, Winterthur (CH); Pascal Gohl, Winterthur (CH)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,316

(22) Filed: Nov. 4, 2019

(65) Prior Publication Data
US 2020/0063913 A1 Feb. 27, 2020

Related U.S. Application Data (63) Continuation of application No. 15/919,448, filed on Mar. 13, 2018, now Pat. No. 10,465,840.
(Continued)

(51) Int. Cl.
*F16M 13/02* (2006.01)
*F16M 11/04* (2006.01)
(Continued)

(52) U.S. Cl.
CPC ........... *F16M 13/02* (2013.01); *B64C 39/024* (2013.01); *B64D 47/08* (2013.01); *F16M 11/041* (2013.01);
(Continued)

(58) Field of Classification Search
CPC .... F16M 13/02; F16M 11/123; F16M 11/041; F16M 11/121; F16M 11/18; F16M 13/04;
(Continued)

(56) References Cited

U.S. PATENT DOCUMENTS 6,175,807 B1 1/2001 Buchler
6,555,803 B1 4/2003 Bremer
(Continued)

FOREIGN PATENT DOCUMENTS

WO 2016190994 12/2016

OTHER PUBLICATIONS

Pedley, "High-Precision Calibration of a Three-Axis Accelerometer" Freescale Semiconductor, Inc., 2013, 35 pages.

*Primary Examiner* — Padma Haliyur
(74) *Attorney, Agent, or Firm* — Young Basile Hanlon & MacFarlane, P.C.

(57) ABSTRACT

The disclosure describes systems and methods for calibrating an image stabilization mechanism. One method includes a control system sending a command to thermally condition one or more sensors to a predetermined temperature. During thermal conditioning to the predetermined temperature, the control system sends a command to drive one or more motors of the image stabilization mechanism to cause movement of an imaging device coupled to the image stabilization mechanism. After thermal conditioning to the predetermined temperature, the control system sends a command to stop driving the one or more motors of the image stabilization mechanism to stop movement of the imaging device coupled to the image stabilization mechanism. After stopping the driving of the one or more motors, the control system sends a command to calibrate the one or more sensors.

20 Claims, 5 Drawing Sheets

Related U.S. Application Data (60) Provisional application No. 62/474,654, filed on Mar. 22, 2017.

(51) Int. Cl.

| | | |
|---|---|---|
| *H04N 5/225* | (2006.01) | |
| *F16M 11/12* | (2006.01) | |
| *F16M 11/18* | (2006.01) | |
| *F16M 13/04* | (2006.01) | |
| *B64D 47/08* | (2006.01) | |
| *G05D 1/00* | (2006.01) | |
| *H04N 5/232* | (2006.01) | |
| *B64C 39/02* | (2006.01) | |
| *G03B 17/56* | (2021.01) | |
| *H04N 17/00* | (2006.01) | |

(52) U.S. Cl.
CPC ......... *F16M 11/121* (2013.01); *F16M 11/123* (2013.01); *F16M 11/18* (2013.01); *F16M 13/04* (2013.01); *G03B 17/561* (2013.01); *G05D 1/0094* (2013.01); *H04N 5/2253* (2013.01); *H04N 5/23203* (2013.01); *H04N 5/23245* (2013.01); *H04N 5/23258* (2013.01); *H04N 17/002* (2013.01); *F16M 2200/041* (2013.01)

(58) Field of Classification Search
CPC ......... F16M 2200/041; H04N 5/23258; H04N 17/002; H04N 5/2253; H04N 5/23245; H04N 5/23203; B64D 47/08; G05D 1/0094; B64C 39/024; G03B 17/561
See application file for complete search history.

(56) References Cited

U.S. PATENT DOCUMENTS

| | | | |
|---|---|---|---|
| 8,049,163 | B1 | 11/2011 | Granneman |
| 9,030,149 | B1* | 5/2015 | Chen .................. A45F 5/10 |
| | | | 318/649 |
| 2006/0018646 | A1* | 1/2006 | Stavely .............. H04N 5/2253 |
| | | | 396/55 |
| 2006/0097108 | A1 | 5/2006 | Liu |
| 2009/0272888 | A1 | 11/2009 | Nugent |
| 2014/0267778 | A1* | 9/2014 | Webb ................. H04N 5/2328 |
| | | | 348/169 |
| 2015/0025801 | A1 | 1/2015 | Linton |
| 2015/0370250 | A1* | 12/2015 | Bachrach ............ G01C 23/00 |
| | | | 701/2 |
| 2016/0201847 | A1 | 7/2016 | Firchau |
| 2016/0352992 | A1 | 12/2016 | Saika |
| 2017/0006340 | A1* | 1/2017 | Enke ............ H04N 21/440281 |
| 2019/0208181 | A1* | 7/2019 | Rowell ............ H04N 5/23267 |
| 2019/0373173 | A1* | 12/2019 | Wang .................. B64C 39/024 |

* cited by examiner

CALIBRATION FOR IMAGE STABILIZATION MECHANISM

CROSS-REFERENCE TO RELATED APPLICATIONS

This application is a continuation application of U.S. patent application Ser. No. 15/919,448, filed on Mar. 13, 2018, which claims the benefit of and priority to U.S. Provisional Patent Application Ser. No. 62/474,654, filed on Mar. 22, 2017, the entire contents of which are hereby incorporated by reference.

TECHNICAL FIELD

The present disclosure relates generally to image stabilization mechanisms, for example, gimbals, and more specifically to calibration processes for image stabilization mechanisms.

BACKGROUND

Image stabilization mechanisms include both motors and sensors, such as inertial measurement units, gyroscopes, and/or accelerometers, that require calibration based on environmental factors such as temperature changes, passage of time since previous usage of the image stabilization mechanism, and/or other factors that impact operation of the image stabilization mechanism. During implementation of some portions of some calibration processes, the motors may be inactive. If an image stabilization mechanism does not include a user interface providing a status of the calibration process to a user, motor inactivity may cause the user to believe that a calibration algorithm is complete, stalled, or otherwise hung-up even though the calibration algorithm is ongoing. Some users under this mistaken impression may choose to interrupt the partially-completed calibration algorithm, for example, by removing a power source. An interrupted calibration process may negatively influence operation of the image stabilization mechanism.

SUMMARY

Improvements in calibration processes for image stabilization mechanisms are described below. A gimbal, one type of image stabilization mechanism, may be communicatively connected to an imaging device, a handheld grip, an unmanned air vehicle (UAV), a remote controller, or another external control device configured to assist in and/or implement a calibration process for the gimbal.

One aspect of the disclosure is method for calibrating an image stabilization mechanism. The method includes a control system sending a command to thermally condition one or more sensors to a predetermined temperature. During thermal conditioning to the predetermined temperature, the control system sends a command to drive one or more motors of the image stabilization mechanism to cause movement of an imaging device coupled to the image stabilization mechanism. After thermal conditioning to the predetermined temperature, the control system sends a command to stop driving the one or more motors of the image stabilization mechanism to stop movement of the imaging device coupled to the image stabilization mechanism. After stopping the driving of the one or more motors, the control system sends a command to calibrate the one or more sensors.

Another aspect of the disclosure is a method for calibrating an image stabilization mechanism. The method includes a control system receiving an indication that one or more sensors is undergoing a calibration process. During the calibration process, the control system sends a command to drive one or more motors of the image stabilization mechanism to cause movement of an imaging device coupled to the image stabilization mechanism. After the calibration process, the control system sends a command to stop driving the one or more motors of the image stabilization mechanism to stop movement of the imaging device coupled to the image stabilization mechanism.

Another aspect of the present disclosure is a method for calibrating an image stabilization mechanism including at least one motor connected to at least one arm configured and dimensioned to support an imaging device. The method includes varying a temperature of at least one sensor in a control system for the image stabilization mechanism during a predetermined interval of time, sending a command to drive the at least one motor to cause movement of the at least one arm during the predetermined interval of time, measuring the temperature of the at least one sensor and comparing the measured temperature to a target temperature, and, after achieving the target temperature, sending a command to stop driving the at least one motor to stop movement of the at least one arm.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed embodiments have other advantages and features that will be more readily apparent from the detailed description, the appended claims, and the accompanying figures. A brief introduction of the figures is below.

DETAILED DESCRIPTION

Image stabilization mechanisms, such as gimbals for stabilizing a variety of imaging devices, include sensitive sensors, such as gyroscopes and accelerometers, that may require occasional calibration for use in high precision activities, such as image-based navigation of a UAV. This disclosure describes improved calibration techniques that provide notice of an ongoing calibration without the need for separate audible or visual indication means associated with the image stabilization mechanism.

The present technology will now be described in detail with reference to the drawings that are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1A:
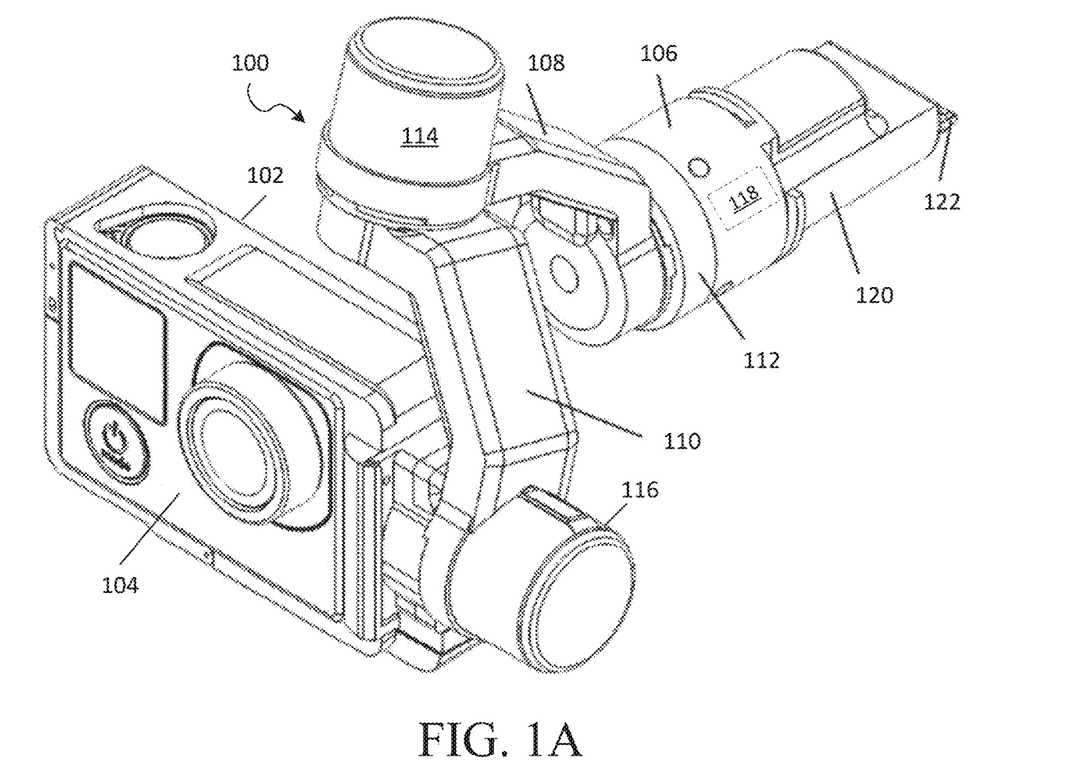
FIG. 1A shows an example of a three-axis image stabilization mechanism.

FIG. 1A shows an example of a three-axis image stabilization mechanism. In this example, the three-axis stabilization mechanism is a gimbal 100. A frame 102 that secures an imaging device 104 is removably coupled to the gimbal 100. The gimbal 100 includes three arms, a first arm 106, a second arm 108, and a third arm 110. The gimbal 100 also includes three motors, a first motor 112, a second motor 114, and a third motor 116, each associated with one or more of the arms 106, 108, 110, for example, at junctures between the arms 106, 108, 110. Each of the motors 112, 114, 116 may include one or more encoders (not shown) that detect axial rotation.

In the example of FIG. 1A, the first motor 112 is integral with the first arm 106. A first end of the second arm 108 is connected to the first arm 106 and the first motor 112. A second end of the second arm 108 is connected to the second motor 114 and a first end of the third arm 110. A second end of the third arm 110 is connected to the third motor 116 and the removable frame 102 securing the imaging device 104. The sequential connections of arms 106, 108, 110 and motors 112, 114, 116 allows for three-axis rotation and control of a mounted object, such as the imaging device 104, in space.

The gimbal 100 operates to maintain the imaging device 104 in a specified orientation. When the gimbal 100 and the imaging device 104 are attached to a platform (e.g., a UAV, a handheld grip, or another platform) that moves in space, the imaging device 104 remains generally motionless in respect to the platform. The gimbal 100 may include a control system 118, either on-board or remote, that provides commands to the motors 112, 114, 116 to maintain the specified orientation of the imaging device 104 based, for example, on information received from sensors (not shown) that indicate instantaneous values for or changes in orientation of the imaging device 104 in respect to each of three axes of rotation (e.g., pitch, roll, and yaw). The specified orientation for the imaging device 104 may be based on: user-provided inputs or settings; sensor-provided information; a presence of a horizon, a tracked object, or other features detected in an image captured by the imaging device 104; an orientation of the gimbal 100 in respect to the platform; or any combination or extension of the preceding elements.

Each of the motors 112, 114, 116 may control orientation of the imaging device 104 about a single axis (e.g., pitch, roll, or yaw), for example, when orientation of the rotational axes of the motors 112, 114, 116 is orthogonal. The axis controlled by each of the motors 112, 114, 116 may depend on the type of platform to which the gimbal 100 is attached. For example, when the gimbal 100 is attached to a UAV, the first motor 112 may rotate the imaging device 104 about a roll axis, the second motor 114 may rotate the imaging device 104 about a yaw axis, and the third motor 116 may rotate the imaging device 104 about a pitch axis. In another example, when the gimbal 100 is attached to a handheld grip, the first motor 112 may rotate the imaging device 104 about a yaw axis, the second motor 114 may rotate the imaging device 104 about a roll axis, and the third motor 116 may rotate the imaging device 104 about a pitch axis.

Some of the motors 112, 114, 116 may control orientation of the imaging device 104 about more than one of the axes (e.g., pitch, roll, and yaw), for example, when orientation of some of the rotational axes of the motors 112, 114, 116 are not orthogonal. In the gimbal 100 shown in FIG. 1A, the first motor 112 and the third motor 116 have axes of rotation that are orthogonal, and the second motor 114 and the third motor 116 have axes of rotation that are orthogonal, but the first motor 112 and second motor 114 have axes of rotation that are not orthogonal. In this example, the first motor 112 may adjust only roll, and the third motor 116 may adjust only pitch, but the second motor 114 may adjust yaw primarily, but also pitch and roll secondarily. This configuration of the gimbal 100, where some of the motors 112, 114, 116 control orientation of the imaging device 104 about more than one of the axes, can allow for a larger field of view for the imaging device 104 while reducing obstructions in the field of view.

The gimbal 100 may include an attachment arm 120 coupled to the first arm 106, the first motor 112, or both, that allows the gimbal 100 to be mounted to a platform (e.g., a UAV, a handheld grip, or any other platform). The attachment arm 120 may be selectively removable. In other examples (not shown), the attachment arm 120 may be coupled to the second arm 108, the third arm 110, the second motor 114, the third motor 116, or any combination thereof. The attachment arm 120 can include a portion of a locking mechanism (not shown) to securely attach the gimbal 100 to a complementary portion of the locking mechanism (not shown) disposed on a platform (e.g., a UAV, a handheld grip, or any other platform). The locking mechanism may include male and female components, frictional components, clamping components, or any other suitable components to achieve locked coupling of the gimbal 100 and the platform.

The gimbal 100 and/or the attachment arm 120 may include a connector 122 for the gimbal 100 to electronically couple to one or more platforms (e.g., a UAV, a handheld grip, or any other platform). The connector 122 may provide power to the gimbal 100 and/or the imaging device 104 mounted in the frame 102. The connector 122 may enable communication between the control system 118 associated with the gimbal 100 and various sensors and/or controllers (not shown) associated with the platform to which the gimbal 100 is mounted.

Though FIG. 1A shows one size and shape for the frame 102 and the imaging device 104, the gimbal 100 may be designed to work with a variety of frame and imaging device combinations. The control system 118 may use different algorithms or control parameters to control the motors 112, 114, 116 based on a mass, center of gravity, and/or moment of inertia for a particular frame and imaging device combination coupled to the gimbal 100. For example, control parameters can include allowed minimums, maximums, and/or ranges for acceleration, velocity, torque, and/or voltage for the motors 112, 114, 116 given identification of the coupled imaging device and frame.

Figure 1B:
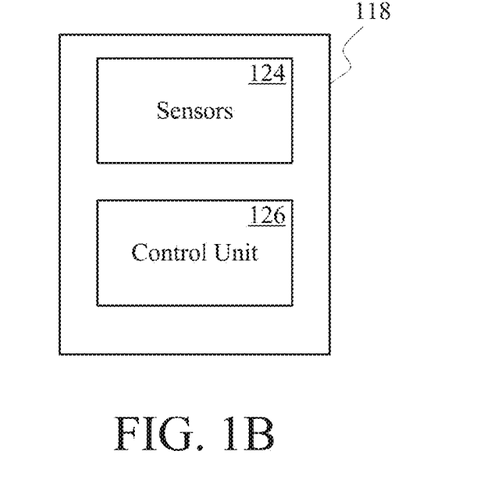
FIG. 1B shows a control system for the three-axis image stabilization mechanism of FIG. 1A.

FIG. 1B shows the control system 118 for the gimbal 100 of FIG. 1A. The control system 118 for the gimbal 100 includes one or more sensors 124 and a control unit 126. The sensors 124 may include: accelerometers, gyroscopes, and magnetometers within an inertial measurement unit (IMU) that determine rotation, orientation, and acceleration; rotary encoders that detect angular position of the motors 112, 114, 116; and a separate magnetometer to detect magnetic fields applied to the gimbal 100. Though a manufacturer may calibrate these sensors 124 upon production, inclusion of the sensors 124 in various packaging configurations and at various locations within a manufactured product such as the gimbal 100 may require additional and/or occasional calibration to account for stresses, both mechanical and thermal, that occur during manufacture, operation, and/or storage of the gimbal 100.

The control unit 126 may receive information from the various sensors 124 indicative of instantaneous orientation, angular velocity, and acceleration of various portions of the gimbal 100, such as each of the arms 106, 108, 110. The control unit 126 may use this information to apply a control algorithm that dictates angular rotation for the motors 112, 114, 116 to achieve a desired orientation for the imaging device 104 in respect to at least one of three rotational axis (e.g., pitch, roll, and yaw). The control algorithm can also account for a variety of imaging device and frame combinations of varying masses and moments of inertia. Based on the control algorithm, the control unit 126 may send commands to the motors 112, 114, 116 of the gimbal 100 to adjust the orientation of the imaging device 104.

Figure 2A:
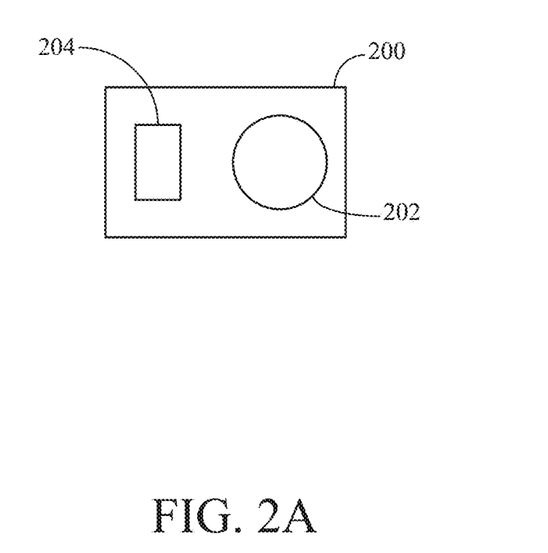
FIG. 2A shows an example of an imaging device for use with the image stabilization mechanism of FIG. 1A.

FIG. 2A shows an example of an imaging device 200 for use with the gimbal 100 of FIG. 1A. The imaging device 200 may be a GoPro Hero4®, Hero5®, or Hero6® camera, however, any type of imaging device that can be coupled to the gimbal 100 may be utilized. The imaging device 200 may be of the same type or a different type than the imaging device 104 of FIG. 1A. The imaging device 200 may include still image and video capture capabilities. The imaging device 200 may include a lens 202, a display screen 204, and a control unit (not shown). Means for coupling the imaging device 200 to the frame 102 for use with the gimbal 100 of FIG. 1A are not shown.

Figure 2B:
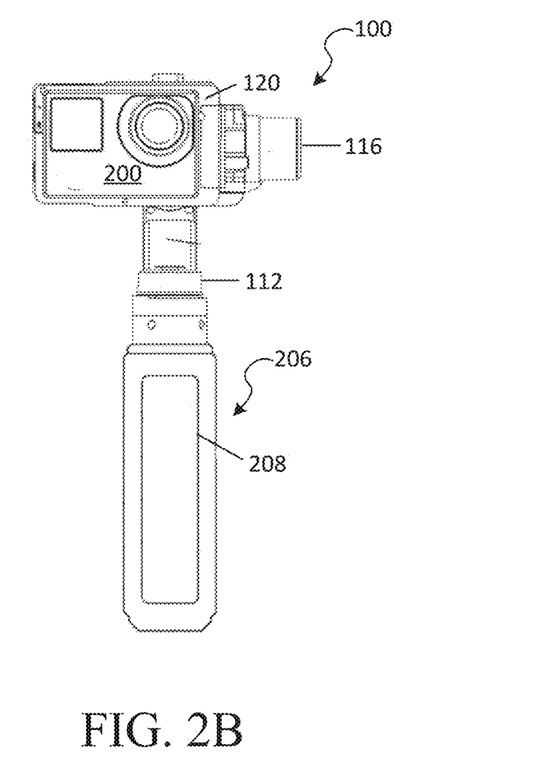
FIG. 2B shows an example of a handheld grip for use with the image stabilization mechanism of FIG. 1A and the imaging device of FIG. 2A.

FIG. 2B shows an example of a handheld grip 206 for use with the gimbal 100 of FIG. 1A and the imaging device 200 of FIG. 2A. The handheld grip 206 is one example of a platform that may support the gimbal 100 mechanically as well as communicate with the gimbal 100 electronically. The handheld grip 206 may include a user interface 208 that receive inputs from a user to control the gimbal 100, the imaging device 200, and/or the handheld grip 206. The handheld grip 206 may include a battery (not shown) or other power source to power the gimbal 100, the imaging device 200, and/or the handheld grip 206.

The handheld grip 206 may include a control unit (not shown) and/or storage capabilities such that image content from the imaging device 200 may be processed or stored within the handheld grip 206. The handheld grip 206 may include a port (not shown) to connect to another device, such as a mobile device or smart phone, that allows communication of image content or other information to/from the imaging device 200 and/or the handheld grip 206. The user interface 208 on the handheld grip 206 may also include a display or other visual indicator indicative of a mode of operation associated with the coupled gimbal 100 and/or the coupled imaging device 200.

Figures 2C, 2D:
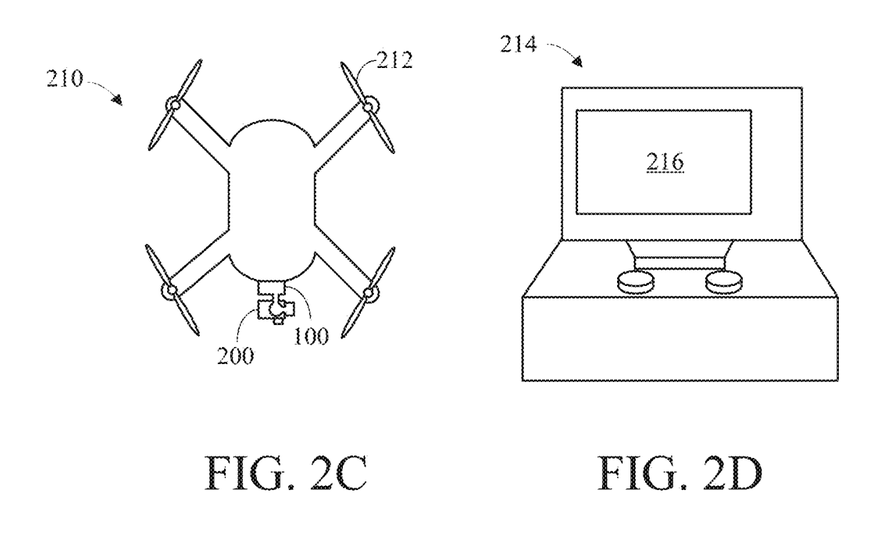
FIG. 2C shows an example of a UAV for use with the image stabilization mechanism of FIG. 1A and the imaging device of FIG. 2A.
FIG. 2D shows an example of a remote controller for the UAV of FIG. 2C.

FIG. 2C shows an example of a UAV 210 for use with the gimbal 100 of FIG. 1A and the imaging device 200 of FIG. 2A. In this embodiment, the UAV 210 has a quad-copter configuration, that is, the UAV 210 includes four rotors 212. Each rotor 212 is driven by a separate electric motor (not shown). However, the UAV 210 may be any form of an aerial vehicle. A battery pack (not shown) mounted on or in a body of the UAV 210 may supply electrical power to all four electric motors, flight electronics (not shown) associated with operation of UAV 210, and the imaging device 200 of FIG. 2A to provide still and video images by means of a communication link (not shown) to a ground-based user. The imaging device 200 may be coupled to a front of the UAV 210 using the gimbal 100 of FIG. 1A.

FIG. 2D shows an example of a remote controller 214 for the UAV 210 of FIG. 2C. The remote controller 214 includes a user interface 216 for operating the UAV 210. The remote controller 214 may include a communications interface (not shown) via which the remote controller 214 may receive and send commands related to operation of the gimbal 100, the imaging device 200, the handheld grip 206, and/or the UAV 210. The commands can include movement commands, configuration commands, operational control commands, calibration commands, and imaging commands. In some implementations, the remote controller 214 may be a smartphone, a tablet computer, a phablet, a smart watch, a portable computer, and/or another device configured to receive user inputs and communicate information with the gimbal 100, imaging device 200, the handheld grip 206, and/or the UAV 210.

For example, flight direction, attitude, and altitude of the UAV 210 may all be controlled by controlling speeds of the motors that drive the respective rotors 212 of the UAV 210. During flight, a GPS receiver on the UAV 210 may provide navigational data to the remote controller 214 for use in determining flight paths and displaying current location through the user interface 216. A vision-based navigation system may also be implemented that tracks visually significant features through image data captured by the imaging device 200 to provide the necessary speed and position of the UAV 210 to the remote controller 214.

The communications interface may utilize any wireless interface configuration, e.g., WiFi, Bluetooth (BT), cellular data link, ZigBee, near field communications (NFC) link, e.g., using ISO/IEC 14443 protocol, ANT+link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 214 may operate a software application configured to perform a variety of operations related to camera configuration, positioning and/or calibration of the gimbal 100, control of video acquisition, and/or display of video captured by the imaging device 200 through the user interface 216. An application may enable a user to create short video clips and share video clips to a cloud service (e.g., Instagram®, Facebook®, YouTube®, Dropbox®); perform full remote control of functions of the imaging device 200; live preview video being captured for shot framing; mark key moments while recording for location and/or playback of video highlights; wirelessly control camera software; and/or perform other functions. Various methodologies may be utilized for configuring the imaging device 200 and/or displaying the captured information.

Figure 3:
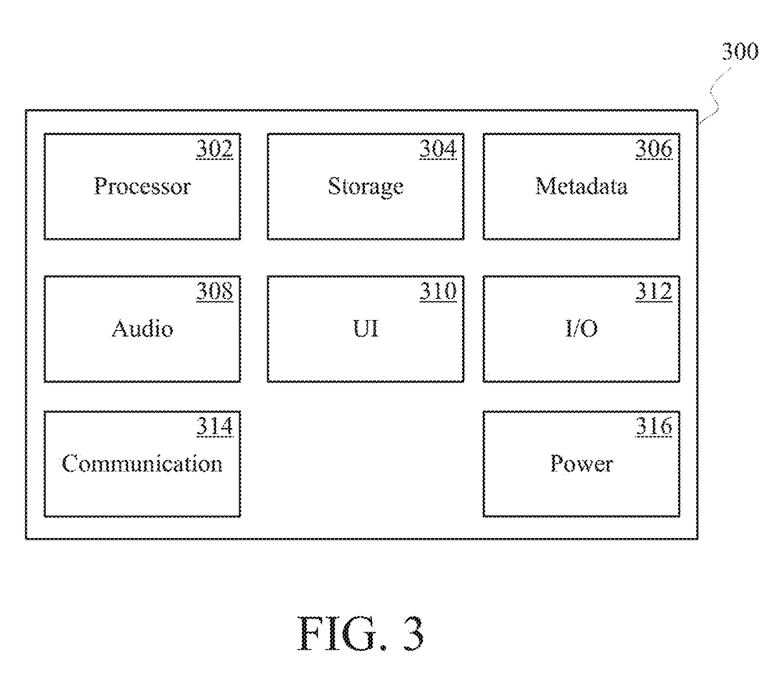
FIG. 3 is a block diagram illustrating components of a computing device.

FIG. 3 is a block diagram illustrating components of a computing device 300. The computing device 300 may be a single component of the gimbal 100, the imaging device 200, the handheld grip 206, the UAV 210, or the remote controller 214. The computing device 300 may be multiple computing devices distributed in various ways between the gimbal 100, the imaging device 200, the handheld grip 206, the UAV 210, or the remote controller 214. In the examples described, the computing device 300 may provide communication and control functions to the various components described in reference to FIGS. 2A, 2B, 2C, and 2D.

The computing device 300 may include a processor 302. The processor 302 may include a system on a chip (SOC), microcontroller, microprocessor, CPU, DSP, ASIC, GPU, or other processors that control the operation and functionality of the gimbal 100, the imaging device 200, the handheld grip 206, the UAV 210, and/or the remote controller 214. The processor 302 may interface with mechanical, electrical, sensory, and power modules via driver interfaces and software abstraction layers. Additional processing and memory capacity may be used to support these processes. These components may be fully controlled by the processor 302. In some implementations, one or more components may be operable by one or more other control processes (e.g., a GPS receiver may include a processing apparatus configured to provide position and motion information to the processor 302 in accordance with a given schedule (e.g., values of latitude, longitude, and elevation at 10 Hz.))

The computing device 300 may also include electronic storage 304 in which configuration parameters, image data, and/or code for functional algorithms may be stored. The electronic storage 304 may include a system memory module that is configured to store executable computer instructions that, when executed by the processor 302, control various functions of the gimbal 100, the imaging device 200, the handheld grip 206, the UAV 210, and/or the remote controller 214. The electronic storage 304 may also include storage memory configured to store content (e.g., metadata, frames, video, and audio) captured by the imaging device 200 or sensors associated with the gimbal 100, the imaging device 200, the handheld grip 206, the UAV 210, and/or the remote controller 214.

The electronic storage 304 may include non-transitory memory configured to store configuration information and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 304 may be available for other hardware, firmware, or software needs of the gimbal 100, the imaging device 200, the handheld grip 206, the UAV 210, and/or the remote controller 214. The memory and processing capacity may aid in management of processing configuration (e.g., loading, replacement) operations during a startup and/or other operations.

The computing device 300 may include or be in communication with metadata sources 306. The metadata sources 306 may include sensors associated with the gimbal 100, the imaging device 200, the handheld grip 206, the UAV 210, and/or the remote controller 214. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 200 may also provide metadata sources 306, e.g., image sensors, a battery monitor, storage parameters, and other information related to camera operation and capture of content. The metadata sources 306 may obtain information related to an environment of the handheld grip 206 and/or the UAV 210 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 306 may be rigidly coupled to the gimbal 100, the imaging device 200, the handheld grip 206, the UAV 210, and/or the remote controller 214 such that the processor 302 may be operable to synchronize various types of information received from various types of metadata sources 306.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 302 may perform operations on the received metadata to generate additional metadata information. For example, the processor 302 may integrate received acceleration information to determine a velocity profile of the imaging device 200 during a recording of a video.

The computing device 300 may include or be in communication with audio sources 308, such as one or more microphones, configured to provide audio information that may be associated with images acquired by the imaging device 200 or commands provided by the remote controller 214. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec.) In one or more implementations of spherical video and audio, the audio codec may include a 3-dimensional audio codec.

The computing device 300 may include or be in communication with a user interface (UI) 310. The UI 310 may include a display configured to provide information related to operation modes (e.g., camera modes, flight modes), connection status (e.g., connected, wireless, wired), power modes (e.g., standby, sensor, video), metadata sources 306 (e.g., heart rate, GPS, barometric), and/or other information associated with the gimbal 100, the imaging device 200, the handheld grip 206, the UAV 210, and/or the remote controller 214. In some implementations, the UI 310 may include virtually any device capable of registering inputs from and communicating outputs to a user. These may include, without limitation, display, touch, gesture, proximity, light, sound receiving/emitting, wired/wireless, and/or other input/output devices. The UI 310 may include a display, one or more tactile elements (e.g., joysticks, switches, buttons, and/or virtual touch screen buttons), lights (LED), speaker, and/or other interface elements.

The UI 310 may be configured to enable the user to provide commands to the gimbal 100, the imaging device 200, the handheld grip 206, the UAV 210, and/or the remote controller 214. For example, the user interface 216 shown in FIG. 2D is one example of the UI 310. User commands provided using the UI 310 may be encoded using a variety of approaches, including but not limited to duration of a button press (pulse width modulation), number of button presses (pulse code modulation), or a combination thereof. For example, two short button presses through the UI 310 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 300 may include an input/output (I/O) module 312. The I/O module 312 may be configured to synchronize the imaging device 200 with the remote controller 214, a second capture device, a smartphone, and/or a video server. The I/O module 312 may be configured to communicate information to and from various I/O components. The I/O module 312 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 312 may interface with LED lights, a display, a button, a microphone, speakers, and other I/O components. In one or more implementations, the I/O module 312 may be coupled to an energy source such as a battery or other DC electrical source.

The computing device 300 may include a communication module 314 coupled to the I/O module 312. The communication module 314 may include a component (e.g., a dongle) having an infrared sensor, a radio frequency transceiver and antenna, an ultrasonic transducer, and/or other communications interfaces used to send and receive wireless communication signals. In some implementations, the communication module 314 may include a local (e.g., Bluetooth, Wi-Fi) or broad range (e.g., cellular LTE) communications interface configured to enable communications between the gimbal 100, the imaging device 200, the handheld grip 206, the UAV 210, and/or the remote controller 214.

The communication module 314 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, the communication module 314 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 314 may be represented using formats including one or more of hypertext markup language (HTML), extensible markup language (XML), and/or other formats. One or more exchanges of information between the imaging device 200 and outside devices, such as the remote controller 214, may be encrypted using encryption technologies including one or more of secure sockets layer (SSL), transport layer security (TLS), virtual private networks (VPNs), Internet Protocol security (IPsec), and/or other encryption technologies.

The computing device 300 may include a power system 316 that may moderate a power supply based on the needs of the gimbal 100, the imaging device 200, the handheld grip 206, the UAV 210, and/or the remote controller 214. For example, a battery, solar cell, inductive (contactless) power source, rectification, or other power supply housed within the handheld grip 206 and/or the UAV 210 may be controlled by the power system 316 to supply power for the gimbal 100 and/or the imaging device 200 when in a coupled state as shown in FIGS. 2B and 2C.

Figure 4:
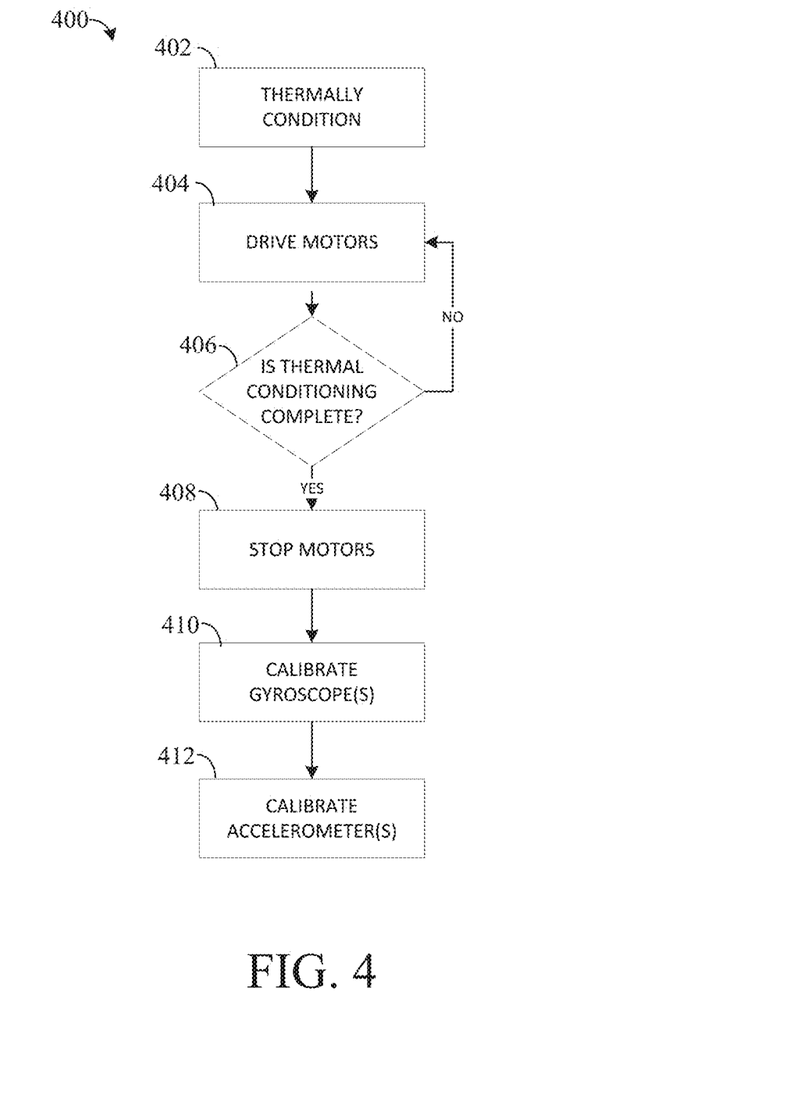
FIG. 4 is a flowchart describing a calibration process for an image stabilization mechanism.

FIG. 4 is a flowchart describing a calibration process 400 for the gimbal 100 of FIG. 1A. At least some of the sensors 124 described in reference to FIGS. 1A and 1B, such as the gyroscope(s) and the accelerometer(s), may be calibrated according to this calibration process 400. The gimbal 100 may undergo the calibration process 400 in order to operate in a manner sufficient to provide image stabilization suitable, for example, for use of image content captured by the imaging device 200 of FIG. 2A in navigation control of the UAV 210 of FIG. 2C.

At operation 402 of the calibration process 400, the control system 118 sends a command to one or more heaters or chillers (not shown) within the gimbal 100 to increase or decrease a temperature of various sensors 124, including, for example, the gyroscope(s) and the accelerometer(s), to a predetermined temperature. The predetermined temperature may be based on a manufacturer's previous and/or initial calibration, may be a predetermined value, or may be within a predetermined range of values to allow independence from additional temperature correction and/or distortion during the calibration process 400. In other words, a predetermined value or range of values for temperature is chosen to avoid making further corrections based on temperature during the calibration process 400. The thermal conditioning of the relevant sensors 124 may take a predetermined time period or duration, for example, between 5 and 20 seconds. During this predetermined time period, a user of the gimbal 100 may not be aware of the ongoing calibration process 400, for example, when the gimbal 100 does not include a display or other indicator associated with the calibration process 400. To alleviate this lack of awareness and avoid unintentional and/or undesired interruption of the calibration process 400 by the user, the calibration process 400 continues to operation 404.

At operation 404, the control system 118 sends commands to one or more of the motors 112, 114, 116 of the gimbal 100 to cause movement of one or more of the arms 106, 108, 110 during the predetermined time period required for thermal conditioning. In one example, all three of the motors 112, 114, 116 are driven to move all three of the arms 106, 108, 110 in a periodic manner, that is, based on a periodic signal such as a sinusoidal signal and/or a square-wave signal sent from the control system 118, thus slowly rotating or moving the imaging device 200 up and down such that the user is alerted to ongoing calibration activity by the movement. In another example, one or more of the motors 112, 114, 116 are drive to move one or more of the arms 106, 108, 110 in a non-periodic manner, that is, based on a non-periodic signal such as a linear signal and/or a logarithmic signal sent from the control system 118. In other examples, anywhere between one and three of the motors 112, 114, 116 are driven to cause movement of the imaging device 200 sufficient to indicate to the user that the calibration process 400 is ongoing.

At decision block 406, the control system 118 determines whether thermal conditioning is complete. If not, the calibration process 400 returns to operation 404 and one or more of the motors 112, 114, 116 are driven to cause movement of or more of the arms 106, 108, 110 in order to generate movement of the imaging device 200. If thermal conditioning is complete, for example, based on the various sensors 124 reaching the predetermined temperature described in respect to operation 402, the calibration process 400 continues to operation 408, and the control system 118 sends a command to stop driving the motor(s) 112, 114, 116.

After the motor(s) 112, 114, 116 are no longer being driven, the calibration process 400 moves to operation 410 which includes calibrating one or more gyroscope(s). To properly function in applications such as navigation of the UAV 210, the gyroscope(s) may require calibration for parameters such as misalignment, acceleration sensitivity, bias stability, drift of bias, and sensitivity due to temperature changes, etc. A variety of known gyroscope calibration techniques may be implemented, and many of these techniques are performed with the motors 112, 114, 116 in a stopped state such that the gyroscope(s) are also stationary. A duration between less than a second and a couple of seconds is required to capture a sufficient number of samples to determine a correction for any bias or offset present in the gyroscope(s). Hence, the lack of driven motors 112, 114, 116 during this portion of the calibration process 400 is not likely to cause a user to believe that the calibration process 400 has stopped or completed.

Upon completion of calibration of the gyroscope(s), the calibration process 400 continues to operation 412 to calibrate one or more accelerometers. To properly function in applications that require high-precision calculation of orientation angles (e.g., pitch, roll, and yaw), such as navigation of the UAV 210, the accelerometer(s) may require gain and offset corrections based on experiencing thermal stresses and/or misalignment due to use and/or installation in the gimbal 100. A variety of known accelerometer calibration techniques may be implemented, with many of these techniques including driving the motors 112, 114, 116 to move the arms 106, 108, 110 to allow sampling of the accelerometer(s) in multiple orientations.

For example, one or more of the motors 112, 114, 116 may be driven in order to move one or more of the arms 106, 108, 110 to cause movement of the imaging device 200 to at least three predetermined orientations during calibration of a three-axis accelerometer(s). In some accelerometer calibrations using three measurement orientations, each of the orientations locates the accelerometer(s) at one of the vertices of an equilateral triangle. Sampling of the accelerometer(s) in this manner allows for correction of any cross-axis interactions while at the same time providing movement of the imaging device 200 throughout the accelerometer calibration sufficient to indicate to a user that the calibration process 400 is ongoing. In some examples, a duration of the operation 412 may be between 5 and 15 seconds.

After operation 412, the calibration process 400 may end. The calibration process 400 may also include additional steps (not shown), such as re-starting and/or powering down and powering up the gimbal 100 in order to implement new settings for the sensors 124 as indicated in information output by the calibration process 400. Other calibration processes (not shown) may also include calibrations for additional sensors 124 within the gimbal 100.

Figure 5:
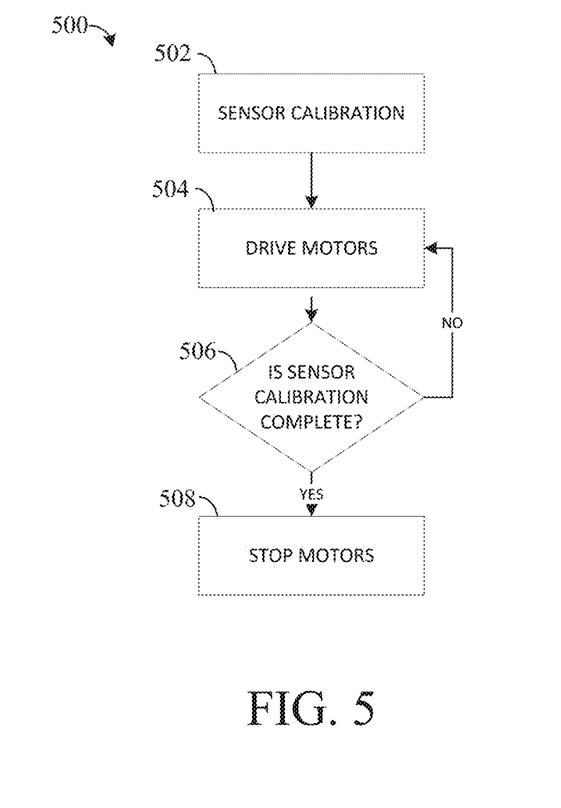
FIG. 5 is a flowchart describing another calibration process for an image stabilization mechanism.

FIG. 5 is a flowchart describing another calibration process 500 for the gimbal 100 of FIG. 1A. The gimbal 100 may undergo the calibration process 500 in order to operate in a manner sufficient to provide image stabilization suitable, for example, for use of image content captured by the imaging device 200 of FIG. 2A in navigation control of the UAV 210 of FIG. 2C.

At operation 502 of the calibration process 500, the control system 118 receives an indication that one of the various sensors 124 associated with the gimbal 100, including, for example, the gyroscope(s) and the accelerometer(s), are undergoing a calibration process. The indication may include information that the calibration process for the relevant sensors 124 may take a predetermined time period or duration, for example, between 5 and 20 seconds. During this predetermined time period, a user of the gimbal 100 may not be aware of the ongoing calibration process 500, for example, when the gimbal 100 does not include a display or other indicator associated with the calibration process 500. To alleviate this lack of awareness and avoid unintentional and/or undesired interruption of the calibration process 500 by the user, the calibration process 500 continues to operation 504.

At operation 504, the control system 118 sends commands to one or more of the motors 112, 114, 116 of the gimbal 100 to cause movement of one or more of the arms 106, 108, 110 during the predetermined time period required for calibration of the relevant sensors 124. In one example, all three of the motors 112, 114, 116 are driven to move all three of the arms 106, 108, 110 in a periodic manner, that is, based on a periodic signal such as a sinusoidal signal and/or a square-wave signal from the control system 118, thus slowly rotating or moving the imaging device 200 up and down such that the user is alerted to ongoing calibration activity by the movement. In other examples, anywhere between one and three of the motors 112, 114, 116 are driven to cause movement of the imaging device 200 in a periodic and/or non-periodic manner sufficient to indicate to the user that the calibration process 500 is ongoing.

At decision block 506, the control system 118 determines whether calibration is complete for the relevant sensor 124. If not, the calibration process 500 returns to operation 504, and one or more of the motors 112, 114, 116 are driven to cause movement of or more of the arms 106, 108, 110 in order to generate movement of the imaging device 200. If calibration is complete for the relevant sensors 124, for example, based on the control system 118 receiving another indication that the relevant sensors 124 have completed the calibration process referred to in operation 502, the calibration process 500 continues to operation 508, and the control system 118 sends a command to stop driving the motor(s) 112, 114, 116. After operation 508, the process 500 may end. The calibration process 500 may also include additional steps (not shown), such as re-starting and/or powering down and powering up the gimbal 100 in order to implement new settings for the relevant sensors 124 having experienced individual calibration processes.

During other calibration processes, or other portions of the calibration processes 400, 500 that are not shown, the control system 118 may send commands to drive one or more of the motors 112, 114, 116 to indicate activity as previously described and depending on a duration of and normal state of the motors 112, 114, 116 within the respective calibration process. In other words, for very short calibration processes for the various sensors 124, for example, under two or three seconds, driving one or more of the motors 112, 114, 116 may not be necessary. For calibration processes of various sensors 124 where one or more of the motors 112, 114, 116 are already driven, separate driving of the one or more motors 112, 114, 116 may not be necessary. For longer calibration processes for the various sensors 124, for example, having durations over three to four seconds, driving one or more of the motors 112, 114, 116 may provide an indication to the user to avoid interruption should the respective calibration processes of the relevant sensors 124 not include sufficient driving of the motors 112, 114, 116 to cause movement of the imaging device 200 at intervals sufficient to provide notice.

Where certain elements of these implementations may be partially or fully implemented using known components, only those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "algorithm," "computer program," or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" or "drone" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method for calibrating an image stabilization mechanism for an image capture device, the method comprising:
   receiving, in a control system, an indication that at least one sensor is undergoing a calibration process, the at least one sensor being provided in the image stabilization mechanism, the image stabilization mechanism connected to the image capture device such that the image capture device is repositionable in relation to the image stabilization mechanism; and
   sending a command to drive at least one motor of the image stabilization mechanism located externally of the image capture device to cause movement of at least one arm located externally of the image capture device and connected to the at least one motor such that the image capture device is repositioned during the calibration process to thereby provide a visual indication that the calibration process is being performed.

2. The method of claim 1, wherein receiving the indication includes receiving an indication that at least one of an accelerometer, a gyroscope, a magnetometer, and a rotary encoder is being calibrated.

3. The method of claim 1, wherein receiving the indication includes receiving information that the calibration process will span a predetermined time period.

4. The method of claim 1, wherein sending the command to drive the at least one motor includes sending a command to drive at least one of a first motor, a second motor, and a third motor.

5. The method of claim 4, wherein sending the command to drive at least one of the first motor, the second motor, and the third motor includes sending a command to drive each of the first motor, the second motor, and the third motor.

6. The method of claim 4, wherein causing movement of the at least one arm includes moving at least one of a first arm connected to the first motor, a second arm connected to the second motor, and a third arm connected to the third motor, at least one of the first arm, the second arm, and the third arm configured to support the image capture device.

7. The method of claim 1, wherein sending the command to drive the at least one motor includes sending a periodic signal or a non-periodic signal.

8. The method of claim 7, wherein the sending the command to drive the at least one motor includes sending at least one of a sinusoidal signal and a square-wave signal.

9. The method of claim 7, wherein sending the command to drive the at least one motor includes sending at least one of a linear signal and a logarithmic signal.

10. The method of claim 1, further including sending a command to stop driving the at least one motor to stop movement of the at least one arm after the calibration process has been completed.

11. The method of claim 10, further including at least one of re-starting the image stabilization mechanism and powering down and powering up the image stabilization mechanism.

12. A method of alerting a user to calibration of at least one sensor in an image stabilization system for an image capture device during a calibration process, the method comprising:
    driving at least one motor of the image stabilization system, the image stabilization system movably connected to the image capture device such that the image capture device is repositionable in relation to the image stabilization system, wherein the motor is located externally of the image capture device to move at least one arm located externally of the image capture device and connected to the at least one motor during the calibration process to reposition the image capture device and thereby provide a visual indication that the calibration process is being performed.

13. The method of claim 12, wherein driving the at least one motor includes moving the at least one arm in a periodic manner or a non-periodic manner.

14. The method of claim 12, wherein driving the at least one motor includes moving the at least one arm to cause corresponding movement of the image capture device, which is supported by the at least one arm.

15. The method of claim 12, further including receiving, in a control system, an indication that the at least one sensor is undergoing a calibration process.

16. The method of claim 15, wherein receiving the indication includes receiving an indication that at least one of an accelerometer, a gyroscope, a magnetometer, and a rotary encoder is being calibrated.

17. The method of claim 12, wherein driving the at least one motor includes driving at least one of a first motor connected to a first arm, a second motor connected to a second arm, and a third motor connected to a third arm to cause movement of at least one of the first arm, the second arm, and the third arm.

18. The method of claim 17, wherein driving at least one of the first motor, the second motor, and the third motor includes driving each of the first motor, the second motor, and the third motor.

19. A method of providing a user with notice of ongoing calibration of at least one sensor in an image stabilization system, the method comprising:
    driving at least one of a first motor connected to a first arm, a second motor connected to a second arm, and a third motor connected to a third arm to cause movement of at least one of the first arm, the second arm, and the third arm during calibration of the at least one sensor,
    wherein at least one of the first arm, the second arm, and the third arm is configured to support an image capture device such that the image capture device is movable in relation to the image stabilization system such that the image capture device is repositioned in relation to the image stabilization system during calibration of the at least one sensor to thereby provide a visual indication that calibration of the at least one sensor is being performed, and wherein the first motor, the first arm, the second motor, the second arm, the third motor, and the third arm are each located externally of the image capture device; and sending a command to stop movement of the image capture device after calibration of the at least one sensor has been completed.

20. The method of claim 19, further including receiving, in a control system, an indication that at least one of an accelerometer, a gyroscope, a magnetometer, and a rotary encoder is being calibrated.

\* \* \* \* \*